US009594356B2

(12) United States Patent
Goepfert et al.

(10) Patent No.: US 9,594,356 B2
(45) Date of Patent: Mar. 14, 2017

(54) CIRCUIT ARRANGEMENT HAVING A FAIL-SILENT FUNCTION

(75) Inventors: Christian Goepfert, Neukirch (DE); Peter Fritsche, Tettnang (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 694 days.

(21) Appl. No.: 14/110,945

(22) PCT Filed: Mar. 30, 2012

(86) PCT No.: PCT/DE2012/100081
§ 371 (c)(1),
(2), (4) Date: Oct. 10, 2013

(87) PCT Pub. No.: WO2012/103873
PCT Pub. Date: Aug. 9, 2012

(65) Prior Publication Data
US 2014/0058541 A1    Feb. 27, 2014

(30) Foreign Application Priority Data
Apr. 11, 2011   (DE) .................. 10 2011 016 706

(51) Int. Cl.
*G06F 11/00* (2006.01)
*G05B 9/02* (2006.01)
*G06F 11/07* (2006.01)

(52) U.S. Cl.
CPC ............ *G05B 9/02* (2013.01); *G06F 11/0739* (2013.01); *G06F 11/0772* (2013.01); *G06F 11/0793* (2013.01)

(58) Field of Classification Search
CPC ............ G06F 11/0772; G06F 11/0793; G06F 11/0739; G05B 9/02
USPC .............................................. 714/40; 700/79
See application file for complete search history.

(56) References Cited

U.S. PATENT DOCUMENTS

| 6,052,746 | A | * | 4/2000 | Kalluri ................ G06F 13/4077 365/194 |
| 6,838,783 | B2 | | 1/2005 | Stierle et al. |
| 7,583,692 | B2 | | 9/2009 | Fuhrmann et al. |
| 8,320,437 | B2 | | 11/2012 | Hartwich et al. |
| 2003/0154427 | A1 | | 8/2003 | Hermann et al. |

(Continued)

FOREIGN PATENT DOCUMENTS

| DE | 101 44 070 | 3/2003 |
| DE | 102 39 846 | 3/2004 |

(Continued)

OTHER PUBLICATIONS

International Search Report of the International Searching Authority for International Application. PCT/DE2012/100081, mailed Jun. 20, 2012, 2 pages, European Patent Office, HV Rijswijk, Netherlands.

(Continued)

*Primary Examiner* — Yair Leibovich
(74) *Attorney, Agent, or Firm* — W. F. Fasse

(57) ABSTRACT

A circuit arrangement for a control device implements a fail-silent and/or fail-safe function, particularly with a hardware-realized detection of a fault or a faulty state in a microcontroller of the circuit arrangement. The circuit arrangement interrupts the communication of the control device with a communications network when a fault is detected.

13 Claims, 5 Drawing Sheets

(56) References Cited

U.S. PATENT DOCUMENTS

| | | | |
|---|---|---|---|
| 2006/0143345 A1* | 6/2006 | Fredriksson | G06F 1/14 710/106 |
| 2009/0083466 A1* | 3/2009 | Hartwich | G06F 13/1663 710/112 |
| 2009/0327549 A1 | 12/2009 | Fuehrer | |
| 2010/0229046 A1 | 9/2010 | Fuehrer et al. | |
| 2010/0262689 A1 | 10/2010 | Ungermann et al. | |

FOREIGN PATENT DOCUMENTS

| | | |
|---|---|---|
| DE | 102 96 400 | 4/2004 |
| DE | 102 55 430 | 6/2004 |
| DE | 103 28 707 | 2/2005 |
| DE | 102005061392 | 6/2007 |
| JP | 2008-537418 A | 9/2008 |
| JP | 2009-521152 A | 5/2009 |
| WO | WO 01/13230 | 2/2001 |

OTHER PUBLICATIONS

English Translation of PCT International Preliminary Report on Patentability of the International Searching Authority for International Application PCT/DE2012/100081, mailed Oct. 17, 2013, 7 pages, International Bureau of WIPO, Geneva, Switzerland.

German Search Report for German Application No. 10 2011 016 706.4, dated Dec. 13, 2011, 5 pages, Muenchen, Germany, with English translation, 5 pages.

Kai Wang et al., "Avoiding the Babbling Idiot Failure in a Communication System Based on Flexible Time Division Multiple Access: A Bus Guardian Solution", IEEE International Symposium on Industrial Electronics (ISLE 2009), Seoul, Korea, Jul. 5-8, 2009, pp. 1292-1297.

Christopher Temple, "Avoiding the Babbling-Idiot Failure in a Time-Triggered Communication System", $28^{th}$ Annual International Symposium on Fault-Tolerant Computing 1998, Munich, Germany, Jun. 23-25, 1998, pp. 218-227.

Giuseppe Buja et al., "Overcoming Babbling-Idiot Failures in the FlexCAN Architecture: A Simple Bus-Guardian", $10^{th}$ IEEE International Conference on Emerging Technologies and Factory Automation, IEEE, New Jersey, USA, Sep. 19, 2005, vol. 2, pp. 461-468, especially pp. 464 and 467.

"FlexRay Communication System Preliminary Node-Local Bus Guardian Specification Version 2.0.9", http://www.flexray.com/index.php?sid=4bbc769e75a6fb585dbeda7fe7bcc70b&pid=93&did=9, Dec. 15, 2005, pp. 1-75, especially pp. 8-10.

* cited by examiner

CIRCUIT ARRANGEMENT HAVING A FAIL-SILENT FUNCTION

FIELD OF THE INVENTION

The invention relates to a circuit arrangement for a control device. The circuit arrangement serves to implement a fail-silent function and/or a fail-safe function.

BACKGROUND INFORMATION

Motor vehicles have a multitude of electronic components/control devices. For example, several control devices are networked via a communications network/via one or several communication channels in modern motor vehicles, wherein the communications network is often a bus line/a bus system, wherein this motor vehicle bus system is usually a CAN bus, a FlexRay bus, or an Ethernet bus. Such a bus system is described, e.g., in Patent Specification DE 102 96 400 B4. The vehicle manufacturer often requires safety-relevant electronic control devices in vehicles to stop communication with the vehicle bus network in the event of an internal fault (also referred to as fail-silent function). The detection of such faults and the interruption of communication is usually performed by means of a software running on a microcontroller of the control device, wherein the software may be executed on the microcontroller to be monitored itself or on a second microcontroller, wherein the second microcontroller serves to monitor a first microcontroller and to interrupt network communication in the event of a fault. Monitoring by means of a watchdog circuit is also well known.

DE 102 55 430 A1 shows, e.g., a circuit arrangement for a control device of a passenger protection system with a microprocessor and a watchdog circuit, wherein the control device serves, e.g., to actuate airbags or seat belt tensioners. The watchdog circuit serves to monitor the operatability of the microprocessor.

A disadvantage of known circuit arrangements for implementing a fail-silent function of a control device consists in the fact that additional hardware (e.g., an additional watchdog circuit or a second microcontroller) has to be installed or that it is necessary to develop special monitoring software. Moreover, the known solutions are not always capable of sufficiently ensuring an interruption of network communication. If, e.g., the microcontroller on which the monitoring software is executed fails itself, an interruption (stop) of network communication by means of software will not be possible any more.

SUMMARY OF THE INVENTION

It is thus an object of at least one embodiment of the invention to specify a device and/or a circuit arrangement by which a reliable and simple (and thus economical) implementation of a fail-silent function and/or a fail-safe function for a control device will be achieved.

The above object can be achieved by a device with the features according to a principal embodiment of the invention. Advantageous realizations and further developments are the subject matter of further inventive aspects or embodiments, wherein combinations and further developments of individual features are also possible.

An underlying idea of at least one embodiment of the invention consists in realizing a fail-silent and/or fail-safe function in a control device, said function operating independently of software elements, wherein, in particular, existing and hardware-realized fault detection mechanisms of a microcontroller are used to control a network driver of the control device (e.g., a bus driver) in the event of a fault in such a manner that the communication of the control device with the network will be interrupted. By means of the proposed circuit arrangement, one can prevent a control device from hanging or remaining in a permanent reset state due to a fault (e.g., during initialization) and prevent the network communication of the control device from being not capable of being interrupted any more as a result thereof. Thus, if an internal damage to a microcontroller of the control device results in the fact that the microcontroller and/or the control device cannot switch to the reset state any more, then an interruption of the network communication of the control device will be ensured, thereby particularly becoming independent of fault detection by means of software to a certain degree.

The inventive circuit arrangement for a control device comprises at least one microcontroller and at least one network driver. The network driver, which can also be referred to as transceiver or network transceiver, is particularly used for the communication of the control device with a communications network, e.g., in a motor vehicle. In particular, the network driver is that constructional unit of the control device which is in charge of transmitting and receiving (data) signals via the communications network, e.g., a bus transceiver or an Ethernet transceiver of the control device.

The at least one microcontroller of the control device preferably comprises a hardware-realized monitoring device that detects and, e.g., stores faults/fault states occurring in individual modules of the microcontroller. The monitoring device also has at least one output in order to inform external components of detected faults/fault states in the microcontroller by means of a signal voltage. A hardware-realized monitoring device is, in particular, a software-independent detection of faults in the microcontroller/in individual modules of the microcontroller. To this end, one may use, e.g., a directly wired, discrete and/or integrated circuit via which the monitoring device of the microcontroller is informed of faults, preferably without using a software or without using any software elements.

According to the invention, the signal voltage at the output of the monitoring device is used to control the network driver in such a manner that the communication of the control device with the communications network will be stopped or interrupted in the event of a fault.

In a preferred realization of the inventive circuit arrangement, the network driver comprises an input by means of which the network communication of the network driver, and thus also the network communication of the control device, can be activated and/or deactivated. If the network driver is a bus transceiver, the input may be, e.g., a BGE pin of a bus guardian. If the network driver is an Ethernet transceiver, the input may be, e.g., a reset pin. The output of the monitoring device that serves to inform external components of detected faults/fault states in the microcontroller by means of a signal voltage is preferably connected to the above-mentioned input of the network driver so that, according to the invention, a particular signal voltage level present at the output of the monitoring device in the event of a fault can be used for the interruption of the network communication of the control device by the network driver in the event of a fault.

For example, the output of the monitoring device may be designed such that a high level of the signal voltage is normally present at said output and a low level of the signal voltage will be present in the event of a fault or vice versa, i.e., a low level is normally present and a high level will be present in the event of a fault. In particular, the monitoring device may also have two outputs, wherein the second output passes an inverted voltage signal to the first output.

Depending on whether the input of the network driver by means of which the network communication of the network driver can be activated and/or deactivated is active low or active high, i.e., interrupts network communication when a low level is present or when a high level is present, the output or one of the outputs of the monitoring device may be connected to the input of the network driver so that network communication will be interrupted in the event of a fault, wherein, in particular, an inverter may be connected between the input of the network driver and the output of the monitoring device.

The inventive circuit arrangement is not limited to a particular network topology or a particular network type. In particular, a control device designed with the inventive circuit arrangement may be arranged in a communications network having a bus, ring or star topology and/or be connected directly, e.g., to another control device, i.e., via a point-to-point connection. In particular, FlexRay, CAN or Ethernet networks are provided as network types.

According to a preferred realization of the inventive circuit arrangement, the network driver of the circuit arrangement is an Ethernet driver, which can also be referred to as Ethernet transceiver and which is used for the communication of the control device with an Ethernet network, wherein the signal voltage that is present at the output of the monitoring device is particularly used to control, when the monitoring device detects a fault, the Ethernet driver in such a manner that it interrupts the communication of the control device with the Ethernet network.

If the network driver of the inventive circuit arrangement is an Ethernet driver, said driver preferably comprises a reset input/a reset pin as the above-described input, by means of which the network communication of the network driver, and thus also the network communication of the control device, can be activated and/or deactivated, wherein the output of the monitoring device is preferably connected to the reset input of the Ethernet driver, wherein a high level or low level of the signal voltage present at the output of the monitoring device in the event of a fault is used to interrupt the Ethernet communication of the control device by means of an active high or active low reset of the Ethernet driver.

If the network driver of the inventive circuit arrangement is an Ethernet driver that, according to the description above, particularly has a reset input, a GPIO pin of the microcontroller may be connected, according to a particular realization of the inventive circuit arrangement, to the reset input, e.g., via an electronic switch, wherein the output of the monitoring device is preferably connected to a control input of the electronic switch in such a manner that, in the event of a fault, a voltage level of the GPIO pin will be overridden by applying a suitable voltage level of the signal voltage to the control input of the electronic switch, whereby the reset input of the Ethernet driver can be controlled in such a manner that the Ethernet driver will interrupt the Ethernet communication of the control device.

According to a further preferred realization of the inventive circuit arrangement, the network driver of the circuit arrangement is a bus driver. The bus driver, which can also be referred to as bus transceiver, is particularly used for the communication of the control device with a bus network as a communications network, e.g., in a motor vehicle.

The microcontroller of the circuit arrangement preferably comprises a hardware-realized monitoring device that detects and, e.g., stores faults/fault states occurring in individual modules of the microcontroller. The monitoring device also has at least one output in order to inform external components of detected faults/fault states in the microcontroller by means of a signal voltage. A hardware-realized monitoring device is, in particular, a software-independent detection of faults in the microcontroller/in individual modules of the microcontroller. To this end, one may use, e.g., a directly wired, discrete and/or integrated circuit via which the monitoring device of the microcontroller is informed of faults, preferably without using a software or without using any software elements.

According to the invention, the signal voltage at the output of the monitoring device is used to control the bus driver in such a manner that the communication of the control device with the bus network will be stopped or interrupted automatically in the event of a fault.

If the network driver of the inventive circuit arrangement is a bus driver, said driver comprises, according to a preferred realization of the inventive circuit arrangement, a bus guardian interface, by means of which the network communication of the network driver, and thus also the network communication of the control device, can be activated and/or deactivated. The bus guardian interface also has at least one input, preferably a bus guardian enable pin (BGE pin), by means of which preferably the bus communication of the bus driver can be activated and deactivated, wherein bus communication can be deactivated, e.g., by applying a low level of a signal voltage to the BGE pin and bus communication is active when a high level of the signal voltage is present. In particular, the BGE pin may also be inverted so that bus communication is active when a low level is present and bus communication is deactivated when a high level is present. Furthermore, the BGE pin may be designed such that it has an internal pull-down resistor that causes the level to be pulled to "low" when an applied input signal is a high-impedance signal. In a particular realization of the inventive circuit arrangement, a further (external) pull-down resistor may be arranged at the BGE pin of the bus driver, particularly in order to ensure a low level for a high-impedance state of the output of the monitoring device.

The monitoring device of the microcontroller carries, at the output of the monitoring device, a signal voltage preferably having a low level in the event of a fault (i.e., in the event of a detection of one or several faults/fault states of one or several modules of the microcontroller by the monitoring device) and normally (i.e., no fault detected) preferably having a high level. Furthermore, the monitoring device may be designed such that a high-impedance signal is present at the output thereof when the microcontroller is, e.g., in the reset state.

If the network driver of the inventive circuit arrangement is a bus driver that particularly comprises a BGE pin, the output of the monitoring device is connected, according to a preferred realization, to the BGE pin of the bus driver, whereby preferably a high level of the output of the monitoring device is normally present at the BGE pin of the bus guardian and the control device is able to communicate with the bus network via the bus driver without restriction. In the event of a fault, a low level of the output of the monitoring device will preferably be applied to the BGE pin of the bus guardian and the bus communication of the control device will be interrupted. If the microcontroller is in the reset state, the output of the monitoring device will preferably be in a high-impedance state. Also in this case, bus communication will be deactivated by the bus driver, particularly if the level is pulled to "low" by an internal pull-down resistor of the BGE pin.

If the network driver of the inventive circuit arrangement is a bus driver that particularly comprises a BGE pin, the output of the monitoring device carries, according to an optional realization, an inverted voltage signal so that a low level is normally present at the output of the monitoring device and a high level will be present in the event of a fault. In this case, the output of the monitoring device is preferably connected to the BGE pin of the bus driver via an inverter, wherein the inverter inverts the level of the voltage signal of the output of the monitoring device so that a high level is normally present at the BGE pin and the bus communication of the control device is possible. On the analogy of the normal case, the high level at the output of the monitoring device will be inverted to a low level in the event of a fault so that the bus communication of the control device via the bus driver will be interrupted.

If the network driver of the inventive circuit arrangement is a bus driver that particularly comprises a BGE pin, the monitoring device may particularly comprise two outputs. One of said outputs carries an inverted voltage signal. In this case, the output of the monitoring device is preferably connected to the BGE pin of the bus guardian carrying a low level in the event of a fault so that no additional inverter is required.

If the network driver of the inventive circuit arrangement is a bus driver that particularly comprises a BGE pin, both the input of the bus guardian interface of the bus driver and the output of the monitoring device of the microcontroller may have an inverted design/supply an inverted voltage signal, wherein the output of the monitoring device is connected, according to the invention, to the input of the bus guardian interface in such a manner that, if necessary, an inverter is connected therebetween so that, in the event of a fault, the level present at the input of the bus guardian interface of the bus driver will be such that bus communication will be interrupted in the event of a fault, wherein, preferably, an inverter is connected between the input and the output if only the input of the bus guardian interface or only the output of the microcontroller has an inverted design. Preferably, no inverter connected between the input and the output is provided if both the input and the output have an inverted design or if neither the input nor the output has an inverted design.

In a preferred variant of embodiment of the inventive circuit arrangement, the network driver is a bus driver, and a FlexRay bus driver/FlexRay (bus) transceiver in particular, and the communications network is a bus network, particularly a FlexRay bus in a motor vehicle.

In a further preferred variant of embodiment of the inventive circuit device, the network driver is a bus driver, and a CAN bus driver/CAN (bus) transceiver in particular, and the communications network is a bus network, particularly a CAN bus in a motor vehicle.

If the network driver of the inventive circuit arrangement is a bus driver, the microcontroller comprises, according to an advantageous realization, at least one GPIO pin (general-purpose input/output pin). The GPIO pin is preferably connected to an STB and/or EN pin of the bus driver, particularly via at least one electronic switch, wherein a control input of the electronic switch is preferably additionally connected to the output of the monitoring device. By applying a suitable level of the output of the monitoring device to the control input of the electronic switch, a voltage level of the GPIO pin of the microcontroller present at the electronic switch will be overridden by the voltage level of the output of the monitoring device in the event of a fault, whereby the electronic switch and the STB and/or EN pin of the bus driver is preferably controlled in such a manner that the bus communication of the control device with the bus network will be interrupted.

In an advantageous realization, the inverter for inverting the inverted voltage signal that is present at the output of the monitoring device and/or the electronic switch connected between at least one GPIO pin of the microcontroller and an STB and/or EN pin of the network driver are designed as transistors.

The inventive circuit arrangement is preferably arranged in a control device that is connected to and communicates with other control devices and electronic components via a communications network, e.g., via a bus network in a motor vehicle. The control device may be, e.g., various vehicle components/electronic or electromechanical systems that are well known in the art, e.g., control devices for the engine, ABS, the air conditioning system, the dashboard, the navigation system, the electronic differential system, cruise control, the soft top, the gearbox, the fuel pump, the ignition system, the airbag, the traction control system, ESP, parking systems, KE-Jetronic, L-Jetronic, the brake system, the lighting system, etc. The control device may also be part of a driver assistance system, e.g., adaptive forward lighting, assistance system for turning the headlights on full beam and for dimming them for low beam, night vision systems, park assist, brake assist, adaptive cruise control, speed control, distance alert, turn assist, traffic jam assist, lane keeping assist, lane keeping support, lane change assist, cornering assist, tire pressure monitoring system, driver drowsiness detection, and road sign recognition. Combinations of the above-mentioned systems and functions are also conceivable.

BRIEF DESCRIPTION OF THE DRAWINGS

Further advantages and optional realizations of the inventive circuit arrangement can be inferred from the description and the drawings. Exemplary embodiments are illustrated in the drawings in a simplified manner and explained in greater detail in the following description.

DETAILED DESCRIPTION OF EXAMPLE EMBODIMENTS OF THE INVENTION

Figure 1:
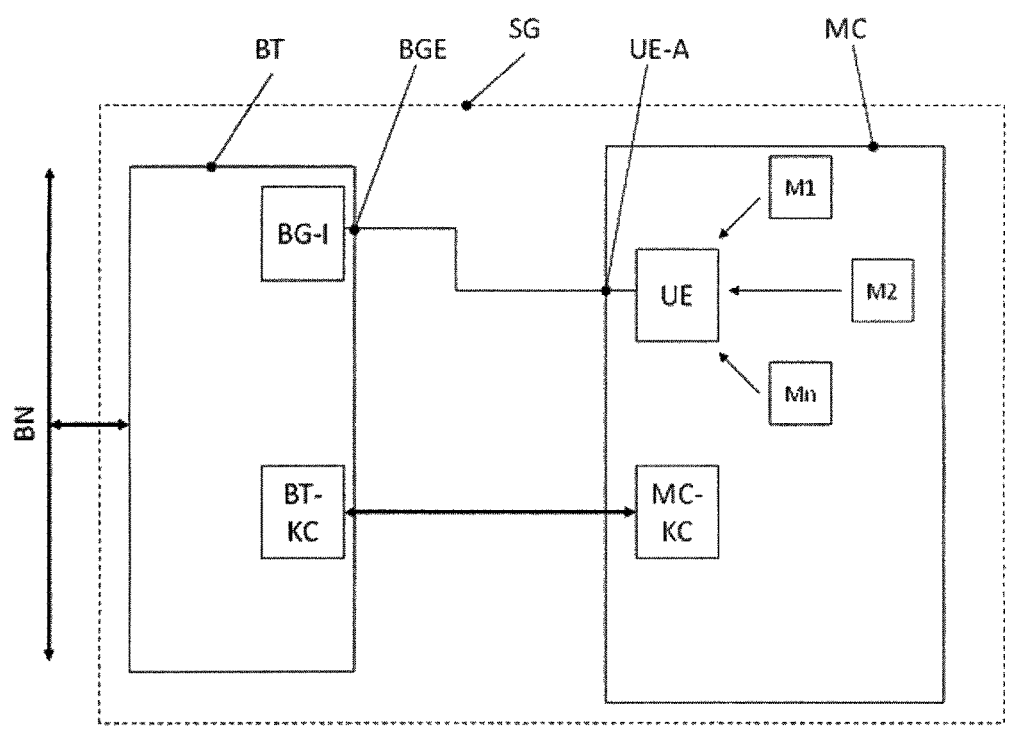
FIG. 1 shows a circuit arrangement with a network driver in the form of a bus driver and with a direct connection between the output of the monitoring device and the BGE pin of the bus driver.

FIG. 1 shows an example of an inventive circuit arrangement for a control device SG. The circuit arrangement comprises a microcontroller MC and, in this case, a network driver in the form of a bus driver BT.

The bus driver BT is used for the communication of the control device SG with a bus network BN, e.g., via a bus interface with BP and/or BM inputs and outputs, and comprises a bus guardian interface BG-I with a BGE pin BGE as well as a communications controller BT-KC, e.g., with TxD, TxEN and RxD pins. Moreover, the bus driver BT may have further modules and pins, e.g., a host interface BT-HI with STB, EN, ERRN and/or SPI pins as well as a power supply unit with Vcc, Vio, Vbat and/or GND pins.

The microcontroller MC also comprises a communications controller MC-KC for communication with the bus driver BT, e.g., via RxD, TxD and TxEN interfaces, as well as a monitoring device UE.

The monitoring device UE is designed such that it can detect and collect faults/fault states of individual modules M1, M2, Mn of the microcontroller MC, wherein fault detection is realized by means of hardware, in particular via an integrated circuit, e.g., via one or several logic circuits, so that fault detection without using software in the microcontroller MC is possible. Moreover, the monitoring device UE may be designed such that it will put the microcontroller MC in a safe state (reset) in the event of a fault, i.e., in the event of a detection of a fault of one or several modules M1, M2, Mn of the microcontroller MC. Moreover, the monitoring device UE carries, depending on whether there is a normal state (i.e., no fault) or a fault, a signal voltage at an output UE-A. In this case, the monitoring device UE normally carries a high level at the output UE-A and will carry a low level in the event of a fault.

The bus driver BT of the circuit arrangement in FIG. 1 is designed such that the communication of the bus driver BT with the bus network BN is interrupted or stopped when a low level of a signal voltage is present at the input BGE of the bus guardian interface BG-I. In this case, the input BGE of the bus guardian interface BG-I is a BGE pin.

According to the invention, the output UE-A of the monitoring device UE is connected to the BGE pin BGE of the bus driver BT. Thus, a low level will be present at the BGE pin BGE of the bus driver BT in the event of a fault so that the communication of the control device SG with the bus network BN will be interrupted automatically in the event of a fault and a reliable and software-independent fail-silent function of the control device SG will be realized by means of the circuit arrangement of FIG. 1 in a simple manner.

Figure 2:
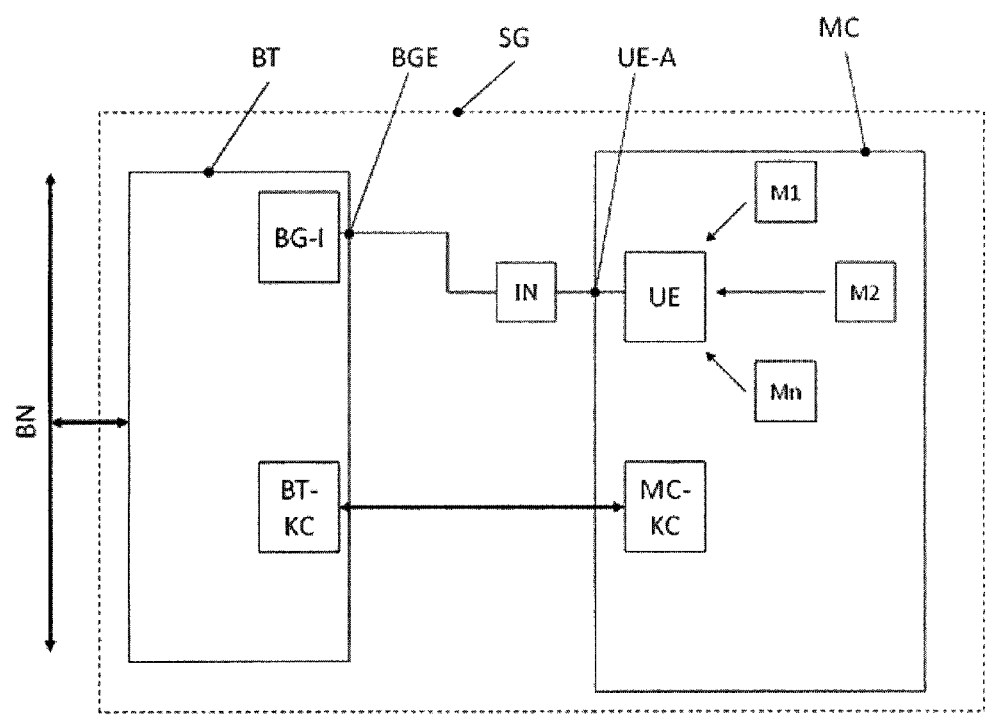
FIG. 2 shows a circuit arrangement with a network driver in the form of a bus driver and with a connection between the output of the monitoring device and the BGE pin of the bus driver via an inverter.

FIG. 2 shows a further inventive circuit arrangement for a control device SG, wherein the circuit arrangement is designed in large part according to the description for FIG. 1. In this case, the monitoring device UE carries an inverted voltage signal at the output UE-A (i.e., normally a low level, and a high level in the event of a fault). As in FIG. 1, the output UE-A is connected to a BGE pin BGE of the bus driver BT, wherein said connection is established via an inverter IN (e.g., a transistor) in this case. The inverter IN inverts the voltage signal that is present at the output UE-A of the monitoring device UE so that the BGE pin BGE of the bus driver BT normally carries a high level and will carry a low level in the event of a fault. Thus, an unrestricted communication of the control device SG with the bus network BN via the bus driver BT is normally possible, wherein the bus driver BT will interrupt the communication of the bus driver BT, and thus that of the control device SG, with the bus network BN in the event of a fault and if a low level is present at the BGE pin BGE.

Figure 3:
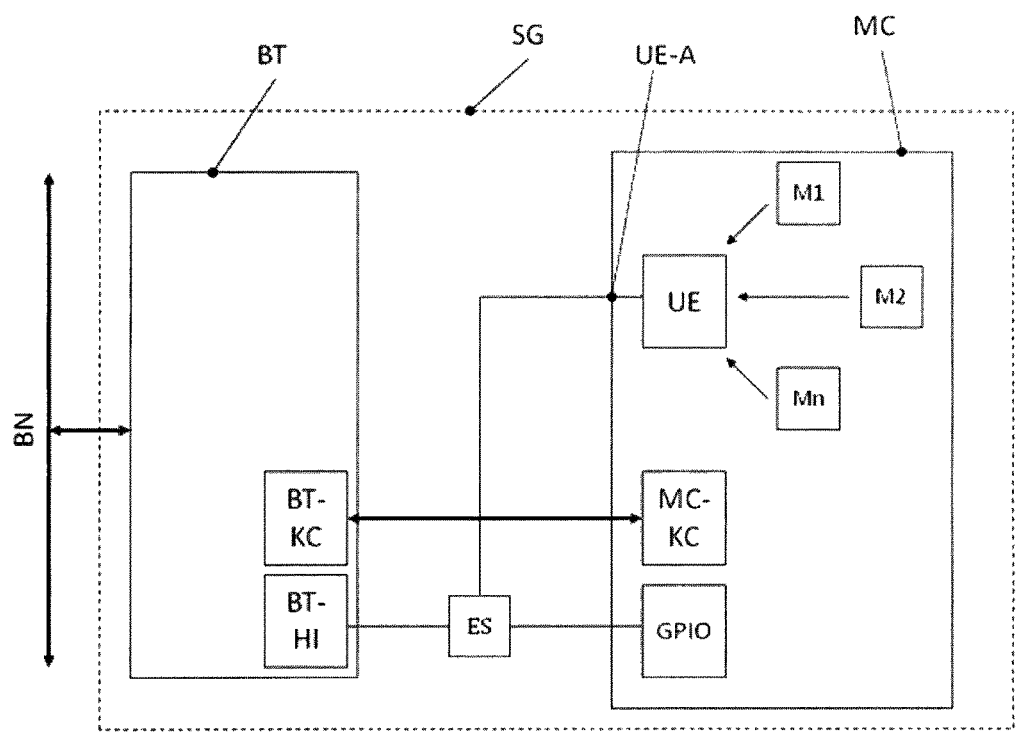
FIG. 3 shows a circuit arrangement with a network driver in the form of a bus driver and with an electronic switch between the GPIO of the microcontroller and the host interface of the bus driver, said electronic switch being controllable via the output of the monitoring device.

FIG. 3 shows a further example of an inventive circuit arrangement, wherein the circuit arrangement is partly designed according to the descriptions for FIG. 1 and FIG. 2. The circuit arrangement according to FIG. 3 is designed such that at least one GPIO pin GPIO of the microcontroller MC is connected to a pin of the host interface BT-HI of the bus driver BT, e.g., to an STBN and/or EN interface, wherein said connection is established via an electronic switch ES (e.g., a transistor). A control input of the electronic switch ES is additionally connected to the output UE-A of the monitoring device UE of the microcontroller. In the event of a fault, the low level of the monitoring device UE will drive the electronic switch ES in such a manner that the voltage level of the GPIO pin GPIO at the electronic switch ES will be overridden. Thus, the STBN and/or EN pin of the bus driver BT will be controlled in such a manner that the communication with the bus network BN via the bus driver BT will be interrupted.

According to the invention, the control device SG or the circuit arrangement of FIGS. 1, 2 and 3 may also comprise further electrical and/or electromechanical/mechanical elements and circuits.

Figure 4:
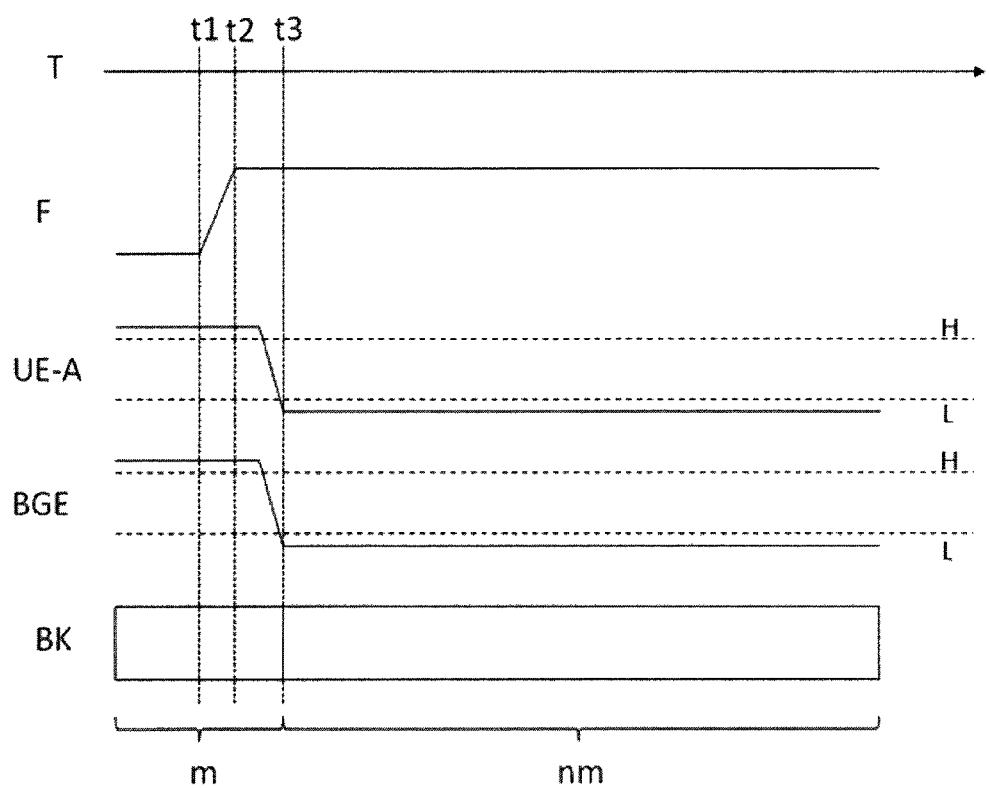
FIG. 4 shows an example of a flow chart for the occurrence of a fault in a module of the microcontroller of FIG. 1.

FIG. 4 shows an example of a flow chart for a circuit arrangement of FIG. 1. If a fault F occurs in the microcontroller MC at instant t1, the monitoring device UE will detect said fault at instant t2, whereupon a low level L will be present at the output UE-A of the monitoring device UE approximately from instant t3. Due to the fact that the output UE-A of the monitoring device UE is connected to the BGE pin BGE of the bus driver BT or the bus guardian interface BG-I thereof, a low level L will also be present at the BGE pin BGE at instant t3 at the latest, whereupon the communication BK of the bus driver BT/of the control device SG with the bus network BN will be interrupted. If no fault F has been detected (i.e., normal case/until instant t1 in this case), a high level H will be present at the output UE-A and bus communication BK will be possible m. From instant t3 (i.e., in the event of a fault), bus communication BK will not be possible any more nm.

In the concrete case of application, one may use, e.g., a microcontroller made by the manufacturer Freescale Semiconductor, e.g., the microcontroller model MPC5643L or the microcontroller model MPC567xK, comprising a fault collection and control unit (FCCU). The FCCU has hardware-realized fault detection and comprises an output (FCCU output) that carries a signal voltage having a high level and a low level depending on the fault detection of the FCCU. In this case, the FCCU output could be connected to a bus guardian enable pin of a bus driver, e.g., of a FlexRay transceiver.

Figure 5:
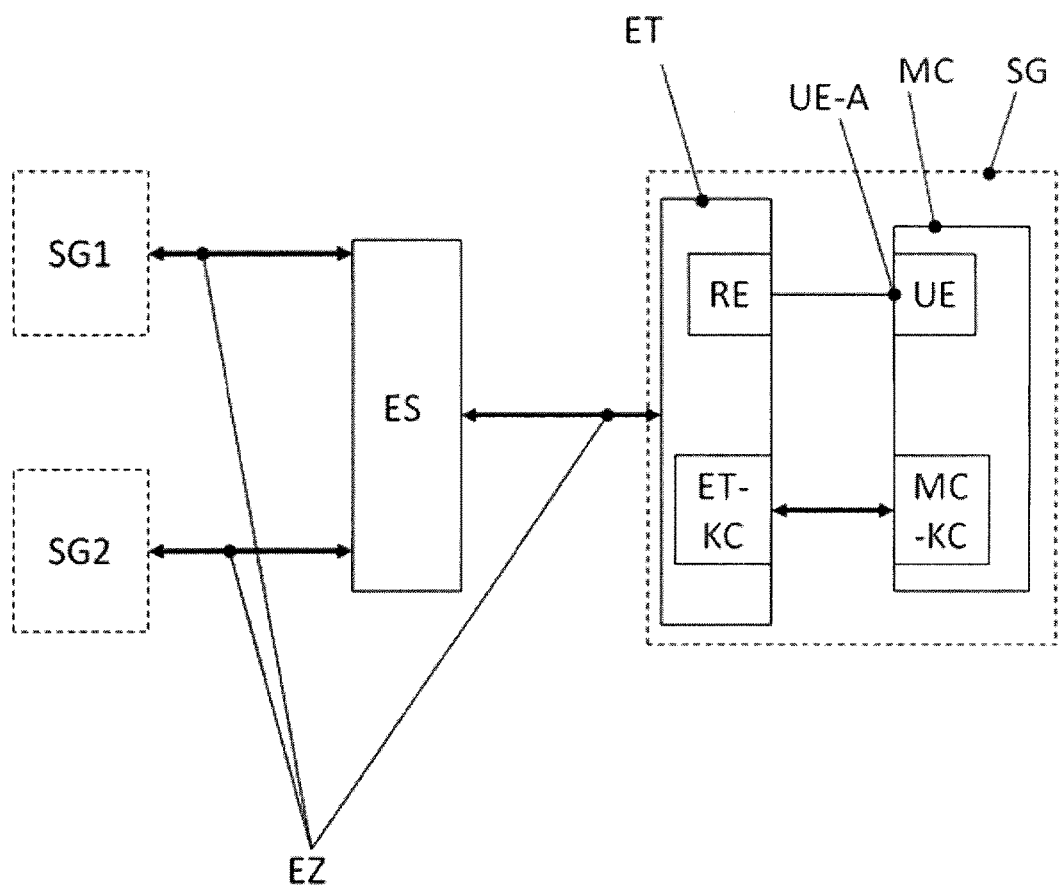
FIG. 5 shows a control device with an inventive circuit arrangement that comprises a network driver in the form of an Ethernet driver, wherein the control device communicates with further control devices in an Ethernet network having a star topology.

FIG. 5 shows a control device SG with an inventive circuit arrangement that comprises a network driver in the form of an Ethernet driver ET in this case. Furthermore, the control device SG is arranged in an Ethernet network (having a star topology in this case) and communicates with further control devices SG1 and SG2 via an Ethernet switch ES and via Ethernet branches EZ.

The Ethernet driver ET comprises a reset pin RE and a communications controller ET-KC. Moreover, the bus driver ET may have further modules and pins.

The microcontroller MC also comprises a communications controller MC-KC for communication with the Ethernet driver ET as well as a monitoring device UE. The microcontroller MC may also have further modules and pins.

The monitoring device UE is designed such that it can detect and/or collect faults/fault states of individual modules, wherein fault detection is realized by means of hardware, in particular via an integrated circuit, e.g., via one or several logic circuits, so that fault detection without using software in the microcontroller MC is possible. Moreover, the monitoring device UE may be designed such that it will put the microcontroller MC in a safe state (reset) in the event of a fault, i.e., in the event of a detection of a fault of one or several modules of the microcontroller MC. Moreover, the monitoring device UE carries, depending on whether there is a normal state (i.e., no fault) or a fault, a particular voltage level of a signal voltage at an output UE-A.

The Ethernet driver ET of the circuit arrangement in FIG. 5 is designed such that the communication of the Ethernet driver ET with the Ethernet network EN is interrupted or stopped when a particular voltage level, in particular a high level or a low level, of a voltage is present, said voltage being applied to the reset pin RE. Thus, the reset pin RE serves to, e.g., implement an active high or active low reset of the Ethernet transceiver ET.

According to FIG. 5, the output UE-A of the monitoring device UE is connected to the reset pin RE of the Ethernet driver ET. Depending on whether the reset pin RE is designed with an active high or active low reset, and depending on whether the output UE-A of the monitoring device UE carries a high level or a low level of the signal voltage in the event of a fault, the output UE-A may be connected to the reset pin RE directly or, e.g., via an inverter IN.

LIST OF REFERENCE NUMERALS

SG control device
BT bus driver
ET Ethernet driver
MC microcontroller
M1 module 1 of microcontroller
M2 module 2 of microcontroller
Mn module n of microcontroller
BN bus network
UE monitoring device
BG-I bus guardian interface
BGE BGE pin
RE reset pin
IN inverter
ES electronic switch
BT-KC bus driver communications controller
ET-KC Ethernet driver communications controller
MC-KC microcontroller communications controller
BT-HI bus driver host interface
GPIO general-purpose input/output
EZ Ethernet branch
ES Ethernet switch
SG1 further control device 1
SG2 further control device 2
T time
t1 instant 1
t2 instant 2
t3 instant 3
F fault
BK bus communication
m bus communication possible
nm bus communication not possible
H high
L low

The invention claimed is:

1. A circuit arrangement for a control device for implementing a fail-silent and/or fail-safe function, comprising:
a microcontroller comprising a hardware-realized monitoring device that is configured to detect faults in individual modules of the microcontroller and that has at least one output configured to provide a signal voltage to inform external components of detected faults, and
a bus driver that is configured to provide a bus communication of the control device with a bus network,
wherein:
the signal voltage is configured and adapted to control the bus driver so that the bus communication of the control device is interrupted when the monitoring device detects a fault,
a GPIO pin of the microcontroller is connected to an STB and/or EN pin of a host interface of the bus driver via an electronic switch,
the output of the monitoring device is connected to a control input of the electronic switch, and
in the event of the fault, a voltage level of the GPIO pin will be overridden by a suitable voltage level of the signal voltage applied from the output of the monitoring device to the control input of the electronic switch, whereby the STB and/or EN pin will be controlled such that the bus driver will interrupt the bus communication of the control device.

2. The circuit arrangement according to claim 1, wherein:
the bus driver has a deactivation input by which the bus communication can be deactivated,
the output of the monitoring device is connected to the deactivation input, and
a particular voltage level of the signal voltage present at the output of the monitoring device in the event of the fault is configured and adapted to cause the bus driver to interrupt the bus communication of the control device.

3. The circuit arrangement according to claim 1, wherein the bus driver comprises a CAN bus transceiver.

4. The circuit arrangement according to claim 1, wherein the electronic switch comprises a transistor.

5. A control device comprising a circuit arrangement according to claim 1 incorporated in said control device.

6. A motor vehicle comprising a circuit arrangement according to claim 1 incorporated in said motor vehicle.

7. A circuit arrangement for a control device for implementing a fail-silent and/or fail-safe function, comprising:
a microcontroller comprising a hardware-realized' monitoring device that is configured to detect faults in individual modules of the microcontroller and that has at least one output configured to provide a signal voltage to inform external components of detected faults, and
a bus driver that is configured to provide a bus communication of the control device with a bus network,
wherein:
the signal voltage is configured and adapted to control the bus driver so that the bus communication of the control device is interrupted when the monitoring device detects a fault,
the bus driver comprises a bus guardian interface with an input,
the output of the monitoring device is connected directly to the input of the bus guardian interface and the output of the monitoring device normally carries a high level of the signal voltage and carries a low level of the signal voltage in the event of the fault, or the output of the monitoring device is connected via an interposed inverter to the input of the bus guardian interface and the output of the monitoring device normally carries a low level of the signal voltage and carries a high level of the signal voltage in the event of the fault, and the bus driver will interrupt the bus communication when the low level is present at the input of the bus guardian interface.

8. The circuit arrangement according to claim 7, wherein the output of the monitoring device is connected directly to the input of the bus guardian interface and the output of the monitoring device normally carries the high level of the signal voltage and carries the low level of the signal voltage in the event of the fault.

9. The circuit arrangement according to claim 7, wherein the output of the monitoring device is connected via the interposed inverter to the input of the bus guardian interface and the output of the monitoring device normally carries the low level of the signal voltage and carries the high level of the signal voltage in the event of the fault.

10. The circuit arrangement according to claim 9, wherein the inverter comprises a transistor.

11. The circuit arrangement according to claim 7, wherein the bus driver comprises a FlexRay bus transceiver.

12. A control device comprising a circuit arrangement according to claim 7 incorporated in said control device.

13. A motor vehicle comprising a circuit arrangement according to claim 7 incorporated in said motor vehicle.

* * * * *

UNITED STATES PATENT AND TRADEMARK OFFICE
CERTIFICATE OF CORRECTION

Page 1 of 1

PATENT NO. : 9,594,356 B2
APPLICATION NO. : 14/110945
DATED : March 14, 2017
INVENTOR(S) : Christian Goepfert et al.

It is certified that error appears in the above-identified patent and that said Letters Patent is hereby corrected as shown below:

On the Title Page

Item [87], PCT Pub. No.: replace "WO2012/103873" with --WO2012/139558--;
PCT Pub. Date: replace "Aug. 9, 2012" with --October 18, 2012--;

In the Claims

Column 10,
Line 46, after "hardware-realized", delete """.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*